Patented Feb. 18, 1941

2,232,610

UNITED STATES PATENT OFFICE 2,232,610

CATALYTIC HYDRATION OF OLEFINS

Walter Philip Joshua, Tonbridge, Herbert Muggleton Stanley, Tadworth, and John Blair Dymock, Tonbridge, England No Drawing. Application April 15, 1937, Serial No. 137,146
In Great Britain November 3, 1932

11 Claims. (Cl. 260—641)

This application is a continuation in-part of the following applications: Serial No. 692,222 filed October 4, 1933; Serial No. 707,416 filed January 19, 1934; Serial No. 738,158 filed August 2, 1934 and Serial No. 21,478 filed May 14, 1935.

This invention relates to the catalytic hydration of the olefins by the combination of the olefins and water vapor to form the corresponding alcohols. The mechanical stability of catalysts suitable for such conversion is of considerable importance especially when high partial pressures of steam are used at high temperatures.

According to the present invention the hydration of olefins is effected with the aid of a catalyst rendered mechanically stable, without its activity being impaired, by incorporating with the active catalytic material during the preparation of the catalyst any organic compound except the metal salts or derivatives thereof. Such an organic compound is capable of leaving upon pyrolysis only a carbon residue which has a skeleton form serving as a frame for the active catalytic material. Preferably the liquid and solid organic compounds of the type indicated are to be preferred from practical considerations.

The incorporation of an organic compound of the type described in the catalyst proper is particularly applicable to catalysts consisting of phosphates containing an excess of phosphoric acid over and above the amount required to form the orthophosphate of the elements or elements employed. When attempt is made to use a catalytic material containing relatively large amounts of phosphoric acid under conditions of high partial steam pressure such as is required at total working pressures between 20 and 100 atmospheres without first preparing the material as above described, it tends to break down mechanically. The mechanical stability of such material could be improved by decreasing the amount of phosphoric acid present in it, but we have found that this reduces materially the activity of the material and diminishes the amount of alcohol which can be produced per unit volume of such material.

Furthermore in the hydration of olefins there are certain limitations from the technical standpoint. In particular the use of certain metals in the construction of the apparatus employed should be avoided either because they are liable to be attacked, especially if a liquid acid catalyst is used, or because they themselves exert an undesired catalytic effect. The employment of solid catalysts therefore is preferable to liquid catalysts not only because of the corrosive action of the latter but also because of the difficulty of maintaining liquid catalysts at constant catalytic strength if continuous operation with constant yield is aimed at. On the other hand solid catalysts as pointed out above are liable to be detrimentally affected as to their physical condition by steam under pressure and if they should disintegrate then their catalytic efficiency is reduced and difficulties in plant operation are encountered. It is an object of the invention to remedy this deficiency in solid catalysts.

It is therefore the principal object of the present invention to provide a catalytic material for the hydration of olefins that will maintain its physical characteristics as a solid and its efficiency as a catalyst for long periods of continuous use under the conditions required in olefin vapor phase hydration processes.

Furthermore another object of the present invention is to provide a hydration catalyst so compounded that while under operating conditions it is substantially non-corrosive to metals, especially steel. From this aspect the catalytic composition provided is one in which has been incorporated during its manufacture a constituent or constituents which render the finished catalyst non-corrosive under operating conditions. As mentioned above however the main object of the invention is to provide a hydration catalytic composition in solid form that has disseminated throughout each pellet granule or other solid piece of the material a constituent that confers mechanical stability on the catalyst under operating conditions. Unless mechanical stability is present in the catalyst then the catalyst is quickly reduced to a slush or mud under the operating conditions of the process and the catalytic efficiency rapidly diminishes.

A still further object of the invention is to provide a solid catalytic material in the form of tablets, pellets or other solid pieces compacted in a press or by extrusion or otherwise and containing as mentioned throughout their structure a mechanically stabilizing carbonaceous skeleton. More particularly the mechanically stabilizing carbonaceous skeleton is produced in situ by carbonization of an organic constituent of the type above mentioned incorporated in the actual catalytic material during its preparation or during the manufacture of the pellets, tablets or other pieces.

The invention is particularly applicable to the preparation of olefin hydration catalysts compounded from a compound or compounds of uranium, boron, copper, iron, manganese, cobalt, calcium, barium, strontium and magnesium and other olefin hydration catalysts of the type indicated wherein the amount of phosphoric acid employed in their preparation is generally in an excess of that required to form the orthophosphate or orthophosphates of the elements involved. Even though the phosphoric acid may be in excess of that required to form the orthophosphate the particular phosphates formed serving as hydration catalysts will depend upon the conditions of the process itself. This is obvious since under some conditions the metaphosphates and other phosphates may be present to the exclusion of any orthophosphates. However the above clearly indicates the type of catalyst in which mechanical stability is a prime requisite which the present invention is designed to provide.

A still further object of the invention is to provide a vapor phase olefin hydration catalyst having the physical properties of non-corrosiveness and sustained structural stability under operating conditions combined with the catalytic advantages of containing acid radicals especially phosphoric acid radicals and preferably containing both metallic phosphate and phosphoric acid, since such catalytic material is highly satisfactory for continuous vapor phase hydration of olefins on a commercial scale when it can be used without attacking the reaction plant and without itself deteriorating in structural and catalytic properties.

A general method of preparation of the composite catalyst is first to mix thoroughly the plain catalyst in finely divided form with a quantity, up to about 20% by weight of the catalyst, of any non-metallic organic compound as above identified. The mass is then baked, ground, tabletted or pelletted and may be rebaked at a suitable temperature, for example 250° C., for a period of one or more hours. Alternatively a part of the total quantity of the additional organic compound may be incorporated in the catalytic material during the preparation prior to baking and grinding and the remainder of the additional organic material may be added after grinding and before tabletting and rebaked.

In order to illustrate the large field of organic compounds which may be used to give mechanical stability to olefin hydration catalysts the following substances are mentioned as purely illustrative and not in a limiting sense.

In order to form a carbon skeleton framework the following may be used. A drying oil such as linseed oil or tung oil. Organic substances which are capable of forming true or colloidal solutions in water and which when subjected to relatively elevated temperatures in admixture with the catalytic material will leave as residue in the catalyst substantially carbon only. As examples sucrose, starch and other carbohydrates such as glucose, fructose and molasses. Also gelatine, pectin and the like and higher alcohols such as glycerol and mannitol. Also non-drying vegetable oils such as castor oil or rape oil or a purified animal oil particularly an oil containing unsaturated radicals such as whale oil or an aliphatic alcohol of high molecular weight such as cetyl alcohol or an aliphatic acid of high molecular weight such as stearic acid, or an oxygen-containing derivative of said alcohol or acid such as an ether, aldehyde, a ketone or an anhydride thereof.

Also the organic constituents may be a water soluble substance and be incorporated in aqueous solution with the catalytic material or it may be incorporated as a dispersion in water, the water serving to ensure thorough dispersion and also functioning during the subsequent carbonization step to ensure penetration of the carbonizing action to the center of each pellet or other compacted piece of the composition.

Furthermore in compounding the above mentioned ingredients a binder may be employed. Such binder may be in an amount up to 20% of the dry weight of the catalytic material. Preferably a drying oil such as linseed oil or tung oil that also supplies carbonaceous residue when carbonized under certain substances as when used in conjunction with phosphoric acid is used. As an alternative to incorporation of the water or aqueous solution or dispersion containing the organic constituent at one stage and of the oil at a second stage these stages may be combined by making an emulsion of the oil with the water or aqueous solution. If desired a dispersion accelerator such as acetone or other water soluble organic compound may also be employed.

The temperature range for the catalytic conversion of olefins or water vapor into their corresponding alcohols is between 100° C. and 350° C. and the pressure range as above mentioned is between 20 and 100 atmospheres.

As is obvious from the above all organic compounds except their metal salts or derivatives are suitable for the construction in situ of the carbon skeleton frame desired in order to render the olefin hydration catalyst of the type indicated stable under the conditions of the process. By such stabilization of the catalyst the catalyst is capable of indefinite use without any diminishing of its catalytic action. Mixtures of the organic constituents indicated may also be used.

A series of examples illustrating the method of compounding the catalyst will now be given. These are also submitted merely as illustrative and are not to be construed in a limiting sense. The results secured by their use is also set forth.

*Example I*

A mixture of one gm. mol. of manganese carbonate, half a gm. mol. of boric anhydride and 3.6 gm. mols. of orthophosphoric acid are digested with water and during the evaporation 18.5 gms. of raw linseed oil are added and at the point of solidification the mass is violently stirred. The resulting mass is then baked at 200° C. and after grinding, a further 3% of raw linseed oil is added and the mass tabletted and the tablets baked at 200° C. for one to two hours. Over the catalyst so prepared and at a temperature of 270° C. ethylene and steam were passed at a total pressure of 20 atmospheres, the steam pressure being 6 atmospheres. A yield of 10.2 grams of alcohol per 100 ccs. of catalyst was obtained per hour. Using 40 atmospheres total pressure, and a temperature of 290° C., the steam pressure being 10 atmospheres, the yield of alcohol was 48 grams per 100 ccs. of catalyst per hour. After 72 hours of running the catalyst had suffered no deterioration whatever.

*Example II*

In place of the 18.5 grams of linseed oil mentioned in Example I tung oil to the extent of 18.5 grams was used in the first stage. After baking at 250° C. the mass was ground with 3% of linseed oil and was tabletted, and the tablets were baked at 200° C. When ethylene and steam were passed over this catalyst under the aforementioned conditions at 270° C. and 20 atmospheres, 8.9 grams of alcohol per 100 cc. of catalyst were obtained per hour. Using a total pressure of 40 atmospheres and 290° C. the yield of alcohol was 11.06 grams per 100 ccs. of catalyst per hour. After 72 hours continuous running the catalysts had suffered no deterioration whatever.

Example III

A catalyst comprising one gram molecule of manganese carbonate, half a gram molecule of boric anhydride and four gram molecules of phosphoric acid was evaporated down to dryness on an air bath in the presence of 35 grams of sucrose. The resulting product was ground and baked at 200° C. until no odor of caramel was perceptible. The dry friable product was ground up with 2 per cent. of linseed oil as binder and tabletted. The tablets were baked at 200° C.

This catalyst when employed at a temperature of 280° C. for the catalytic conversion of ethylene into ethyl alcohol by means of steam, using a total pressure of 40 atmospheres, i. e. 10 atmospheres of steam and 30 atmospheres of ethylene, remained mechanically stable, and produced a yield of ethyl alcohol of 248 grams per litre of catalyst per hour.

A catalyst of similar composition but without the inclusion of sucrose could not have been produced in a form sufficiently friable to allow of tabletting and would under the above pressure conditions have changed to a mud within about two hours and would not have given such high yields of alcohol.

Example IV

A catalyst comprising one gram molecule of calcium oxide, half a gram molecule of boric anhydride, and four gram molecules of phosphoric acid was evaporated down to dryness on an air bath in the presence of 30 gram molecules of sucrose. The mass was treated in the same way as in Example III, but tabletted with 3 per cent of linseed oil as binder.

When used under the same temperature and pressure conditions as in Example III, the catalyst remained mechanically stable and yielded, per litre of catalyst, 257 grams of ethyl alcohol per hour.

Example V

A catalyst comprising one molecule manganese carbonate, half a gram molecule of boric anhydride and 3.6 gram molecules of phosphoric acid was evaporated down to dryness in the presence of 5 per cent glycerine, calculated on the dry weight of catalyst. The mass was treated as in Example IV, being tabletted with 3 per cent. of linseed oil as binder.

The output of ethyl alcohol from ethylene and steam under similar temperature and pressure conditions to those used in Examples III and IV was 110.7 grams per hour.

Example VI

A mixture of 1 molecule of manganese oxide, ½ mol. of boron trioxide and 3.6 mols. of phosphoric acid was evaporated to dryness with 5 per cent of castor oil and the dried mass baked at 200° C. The mass obtained was ground and tabletted with the addition of 2 to 3 per cent of linseed oil as binder and rebaked. Over a catalyst prepared in this manner and maintained at a temperature of 260° C. a mixture of ethylene and steam at the rate of 400 litres of the ethylene per hour measured at normal temperature and pressure was passed at a total pressure of 20 atmospheres, the steam pressure being 6 atmospheres. A yield of 8.6 grams per 100 cc. of catalyst was obtained per hour. Using 40 atmospheres total pressure, the steam pressure being 10 atmospheres and the rate of supply of ethylene being 1100 litres per hour measured at normal temperature and pressure, the yield of alcohol was 19.3 grams per 100 cc. of catalyst per hour. This yield was maintained during 50 hours of running and the catalyst had suffered no deterioration whatever.

Example VII

In place of the castor oil mentioned in Example VI, 5 per cent of cetyl alcohol was incorporated in the active catalytic material, and the mass was baked at 250° C. After baking it was ground and tabletted with 2 to 3 per cent linseed oil as binder and rebaked. Using the same conditions mentioned in Example VI, the yields of alcohol were 5.61 grams at 20 atmospheres total pressure and 16.85 grams at 40 atmospheres total pressure, per 100 cc. of catalyst per hour. After 24 hours of running the catalyst had suffered no deterioration whatever and a uniform output of alcohol was maintained throughout the period of running.

Example VIII

The catalyst was prepared by evaporating 1 molecule of calcium oxide, ½ mol. boron trioxide and 2.6 mols. phosphoric acid with 5 per cent of rape oil, and baking the mass at 200° C. The baked mass was ground and tableted with 2½ per cent linseed oil as binder and rebaked. Over this catalyst a mixture of propylene and steam was passed at a temperature of 260° C. under a total pressure of 20 atmospheres, the steam pressure being 9.5 atmospheres, at a rate of 400 litres of the propylene per hour, measured at normal temperature and pressure. The output of isopropyl alcohol was 15.1 grams per 100 cc. of catalyst per hour. This output was maintained for several days and the catalyst suffered no deterioration whatever.

Catalysts similar to those above described but without the inclusion of the mechanical stabilizing ingredient could not have been produced in a form sufficiently friable to allow of tableting and would under the pressure conditions have changed to a mud within about two hours and would not have given such high yields of alcohol.

Example IX

A catalytic composition was first prepared by making a suspension of manganese carbonate and boric anhydride in water and adding thereto phosphoric acid (as $H_3PO_4$), these constituents being in the ratio of 3.2 mols. of the acid to 1 mol. of the carbonate and 0.5 mol. of the boric anhydride whereby there is formed a complex of manganese phosphate and boron phosphate and phosphoric acid in excess of that required to form the normal phosphates of the boron and manganese. This solution was evaporated down to dryness and broken into small pieces and heated at 250° C. for 2 hours. The dried pieces were then ground to a fine powder and graded and the graded powder was again dried at 250° C. for 2 hours. 600 grams of the dry powder were then mixed intimately with a solution of 6 grams of sucrose in 40 grams of water, and then with 70 grams of tung oil dissolved in an equal volume of petroleum ether. Instead of making a dry powder by heating before adding the sucrose a certain amount of water (as hereinafter specified) might be left in the mass during the evaporation stage but the advantage of thoroughly drying before adding the sucrose solution is that the minimum amount of water contained in the mass before the final heating or carbonization is then more accurately known and moreover the complete drying facilitates the grinding and grading. It has been found that in order to secure the most thorough carbonization the amount of water present should not be less than 2 per cent by weight of the dry catalytic material. The amount of water added in this example is in excess of 2 per cent and the resulting mass is fit for a moulding operation, preferably extrusion. Obviously, however, the mass instead of being extruded might be tableted in which case the water and oil content must be adjusted (somewhat less than for extrusion) to facilitate that operation. An excess of water would merely entail wasteful evaporation. A knowledge of the appropriate amount for each circumstance is readily acquired by experience. The resulting mass in the present instance was extruded through a 6 millimetre die and cut into rods of about 10 millimetres long. The resultant short rod-like catalytic material was then again heated slowly to 250° C. and maintained at that temperature for two hours to effect carbonization. The catalytic material so prepared was very hard and durable and was physically homogeneous, the body of each piece being black in appearance throughout due to the skeleton of carbon residue resulting from the carbonization of the sucrose and the tung oil. Vapor phase hydration of ethylene by the use of this material was carried on continuously in a steel vessel by passing ethylene and steam in the ratio of 3 mols. to 1 mol. under a total pressure of 40 atmospheres over 1 litre of the catalytic material maintained at a temperature of 260° C. at a rate of about 20,000 litres per hour of the ethylene (measured at normal temperature and pressure). The hourly output of alcohol was 410 grams in the form of a 7.2 per cent aqueous condensate. Only negligible quantities of polymers and acetaldehyde were formed. After a prolonged period of operation the fragments of catalyst were still catalytically active and structurally stable and the reaction vessel showed no signs of corrosion.

*Example X*

A catalytic composition was prepared in the manner described in Example IX but in the ratio of 2.8 mols. of phosphoric acid (as $H_3PO_4$) to 1 mol. of manganese carbonate and 0.5 mol. of boric anhydride.

With 1000 grams of the dry graded powder was intimately mixed first a solution of 10 grams of sucrose in 60 grams of water and then 130 grams of tung oil dissolved in an equal volume of petroleum ether. After a thorough mixing of the resulting mass 50 grams of water were added. The added water is required in this case because the acidity of the catalytic material is less than in Example IX. The mass was then extruded through a die 6 millimetres in diameter and was cut into short lengths and heated slowly to 250° C. at which temperature it was maintained for 2 hours to ensure thorough carbonization throughout the body of each fragment. Under the same conditions of hydration of ethylene as in Example IX, the alcohol output per litre of catalyst was 300 grams per hour in the form of a 6.1 per cent. aqueous distillate. After a prolonged period of operation the catalyst was still catalytically active and structurally stable and the reaction vessel showed no signs of corrosion.

After forming the constituents into compacted pieces as by tableting or by extrusion and cutting into short lengths, the compacted pieces may be matured for several hours by heating at a temperature of only about 100° C. to 150° C. before subjecting them to the higher temperature mentioned, namely 250° C.

The procedure set out above in Examples IX and X is of course capable of various modifications. For example, although the employment of tung oil in petroleum ether has been mentioned as the binder which serves also as a provider of residual carbon during carbonization, we may employ linseed oil instead of tung oil or a mixture of linseed oil and tung oil or a vegetable non-drying oil such as castor oil or rape oil, or a purified animal oil particularly an oil containing unsaturated radicals such as whale oil, or an aliphatic alcohol or acid of high molecular weight such as cetyl alcohol or stearic acid or derivatives thereof. Instead of petroleum ether we may use any other suitable volatile solvent preferably a complete volatile organic solvent such as benzene and instead of sucrose as the organic constituent to provide the carbon skeleton in the finished catalyst we may employ, for example glucose, fructose, molasses, starch, gelatine, pectin and higher alcohols such as glycerol and mannitol. The organic constituent employed to form the carbon skeleton need not be capable of forming a solution or even a colloidal solution provided it is capable of giving the desired carbonaceous structure under the conditions of the preparation of the catalyst; for example proteins such as casein insoluble in water may be used or cellulosic material or cellulose derivatives such as cellulose esters or ethers.

We claim:

1. An olefin hydration catalyst composed of solid compacted bodies comprising essentially a phosphate and excess phosphoric acid and a uniformly distributed skeleton of substantially only carbon derived from organic material which when heated to a carbonizing temperature leaves in situ substantially only said carbon skeleton serving to structurally strengthen said bodies and render them noncorroding.

2. A process of catalytically converting olefins and water vapor into the corresponding alcohols which comprises passing the olefins and steam under pressure in admixture under a total pressure ranging from 20 to 100 atmospheres and at a temperature ranging from 100° C. to 350° C. over a catalyst composed of solid compacted bodies comprising essentially a phosphate and excess phosphoric acid and a uniformly distributed skeleton of substantially only carbon derived from organic material which when heated to a carbonizing temperature leaves in situ substantially only said carbon skeleton serving to structurally strengthen said bodies and render them noncorroding.

3. A process of manufacturing an olefin hydration catalyst comprising essentially incorporating an organic substance which when heated to a carbonizing temperature leaves substantially only carbon into a phosphate and excess phosphoric acid compacting the mixture into pieces and heating them sufficiently to char the organic substance and leave in situ a skeleton of substantially only carbon serving to structurally strengthen said pieces and render them noncorroding.

4. An olefin hydration catalyst composed of solid compacted bodies comprising essentially a hydration catalyst and a uniformly distributed skeleton of substantially only carbon derived from organic material which when heated to a carbonizing temperature leaves in situ substantially only said carbon skeleton serving to structurally strengthen said bodies and render them noncorroding.

5. An olefin hydration catalyst composed of solid compacted bodies comprising essentially a hydration catalyst wherein an excess of a mineral acid is incorporated and a uniformly distributed skeleton of substantially only carbon derived from organic material which when heated to a carbonizing temperature leaves in situ substantially only said carbon skeleton serving to structurally strengthen said bodies and render them noncorroding.

6. A process of catalytically converting olefins and water vapor into the corresponding alcohols which comprises passing said olefins and steam over a catalyst composed of solid compacted bodies comprising essentially a phosphate, and excess phosphoric acid and a uniformly distributed skeleton of substantially only carbon derived from organic material which when heated to a carbonizing temperature leaves in situ substantially only said carbon skeleton serving to structurally strengthen said bodies and render them noncorroding.

7. A process of catalytically converting olefins and water vapor into the corresponding alcohols which comprises passing the olefins and steam under pressure in admixture of a catalyst composed of solid compacted bodies comprising substantially a hydration catalyst and a uniformly distributed skeleton of substantially only carbon derived from organic material which when heated to a carbonizing temperature leaves in situ substantially only said carbon skeleton serving to structurally strengthen said bodies and render them noncorroding.

8. A process of catalytically converting olefins and water vapor into the corresponding alcohols which comprises passing said olefins and steam in admixture over a catalyst composed of solid compacted bodies comprising essentially a hydration catalyst wherein an excess of a mineral acid is incorporated and a uniformly distributed skeleton of substantially only carbon derived from organic material which when heated to a carbonizing temperature leaves in situ substantially only said carbon skeleton serving to structurally strengthen said bodies and render them noncorroding.

9. A process of manufacturing an olefin hydration catalyst comprising essentially incorporating an organic substance which when heated to a carbonizing temperature leaves substantially only carbon into a hydration catalyst, compacting the mixture into pieces and then heating such pieces sufficiently to char the organic substance and leave in situ a skeleton of substantially only carbon serving to structurally strengthen said pieces and render them noncorroding.

10. A process of manufacturing an olefin hydration catalyst comprising essentially incorporating an organic substance which when heated to a carbonizing temperature leaves substantially only carbon into a hydration catalyst, then compacting the mixture so formed and then heating said mixture so as to char said organic substance and leave in situ a skeleton of substantially only carbon serving to structurally strengthen said catalyst and render it noncorroding.

11. A process of manufacturing an olefin hydration catalyst comprising essentially incorporating an organic substance which when heated to a carbonizing temperature leaves substantially only carbon into a hydration catalyst, wherein an excess of a mineral acid is incorporated, then compacting the mixture so formed and then heating said mixture so as to char said organic substance and leave in situ a skeleton of substantially only carbon serving to structurally strengthen said catalyst and render it noncorroding.

WALTER PHILIP JOSHUA.
HERBERT MUGGLETON STANLEY.
JOHN BLAIR DYMOCK.